(12) United States Patent
Della Corte et al.

(10) Patent No.: US 9,774,605 B2
(45) Date of Patent: Sep. 26, 2017

(54) TEMPORARY AUTHORIZATIONS TO ACCESS A COMPUTING SYSTEM BASED ON USER SKILLS

(71) Applicant: INTERNATIONAL BUSINESS MACHINES CORORATION, Armonk, NY (US)

(72) Inventors: Gianluca Della Corte, Rome (IT); Alessandro Donatelli, Rome (IT); Antonio M. Sgro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/837,365

(22) Filed: Aug. 27, 2015

(65) Prior Publication Data

US 2016/0065585 A1 Mar. 3, 2016

(30) Foreign Application Priority Data

Sep. 1, 2014 (GB) .................................. 1415426.4

(51) Int. Cl.
*G06F 7/04* (2006.01)
*H04L 29/06* (2006.01)
*G06F 21/62* (2013.01)

(52) U.S. Cl.
CPC ........ *H04L 63/102* (2013.01); *G06F 21/6218* (2013.01); *H04L 63/108* (2013.01); *G06F 2221/2137* (2013.01); *G06F 2221/2141* (2013.01)

(58) Field of Classification Search
CPC ............ H04L 9/00; H04L 9/088; G06F 21/62
USPC .............................. 726/4–7; 705/54; 718/100
See application file for complete search history.

(56) References Cited

U.S. PATENT DOCUMENTS

| 7,845,951 | B1 | 12/2010 | Goon |
| 7,941,861 | B2 | 5/2011 | van der Bogert et al. |
| 8,024,813 | B2 | 9/2011 | Hong et al. |
| 8,069,117 | B1* | 11/2011 | Gay .................... G06F 21/604 705/18 |
| 8,442,960 | B1 | 5/2013 | Meyer et al. |

(Continued)

OTHER PUBLICATIONS

Anonymous, "Privileges for Multithreaded Applications," IP.com No. 000219104, Jun. 19, 2012, pp. cover, 1-2.

(Continued)

*Primary Examiner* — Dede Zecher
*Assistant Examiner* — Viral Lakhia
(74) *Attorney, Agent, or Firm* — Heslin Rothenberg Farley & Mesiti P.C.

(57) ABSTRACT

Controlling access to a computing system. An escalation request is received for performing a protected activity on the computing system by a user not authorized to perform the protected activity. At least one activity indicator being indicative of a skill required to perform the protected activity is retrieved. At least one user indicator being indicative of the skill possessed by the user is retrieved. An indication of a capability of the user to perform the protected activity according to a comparison between the at least one activity indicator and the at least one user indicator is determined. A temporary authorization for performing the protected activity to the user according to the capability thereof is granted or denied. The temporary authorization lasts for a limited time window.

14 Claims, 6 Drawing Sheets

(56) References Cited

U.S. PATENT DOCUMENTS

| | | | |
|---|---|---|---|
| 8,490,093 B2* | 7/2013 | Russinovich | G06F 12/1491 718/100 |
| 8,555,403 B1 | 10/2013 | Kilday | |
| 2009/0052675 A1* | 2/2009 | Levow | G06F 21/33 380/278 |
| 2009/0164490 A1* | 6/2009 | Wininger | G06Q 10/06 |
| 2009/0177529 A1* | 7/2009 | Hadi | G06Q 30/02 705/35 |
| 2009/0300532 A1 | 12/2009 | Cowan | |
| 2012/0054875 A1* | 3/2012 | Antill | G06F 21/10 726/28 |
| 2012/0291102 A1* | 11/2012 | Cohen | G06F 21/629 726/4 |
| 2013/0086658 A1* | 4/2013 | Kottahachchi | G06F 21/45 726/6 |
| 2014/0059651 A1* | 2/2014 | Luster | G06F 21/604 726/4 |
| 2014/0189808 A1* | 7/2014 | Mahaffey | H04L 63/0853 726/4 |
| 2014/0195626 A1* | 7/2014 | Ruff | H04L 63/104 709/206 |
| 2014/0273855 A1* | 9/2014 | Jang | H04W 4/008 455/41.2 |
| 2014/0310771 A1* | 10/2014 | Marshall | G06F 21/6218 726/2 |
| 2014/0310772 A1* | 10/2014 | Marshall | G06F 21/629 726/2 |

OTHER PUBLICATIONS

"Windows Install Deployment on Windows Vista," https://msdn.microsoft.com/en-us/library/bb384154(d=printer).aspx, downloaded from internet Jul. 2, 2015, pp. 1-3.

* cited by examiner

TEMPORARY AUTHORIZATIONS TO ACCESS A COMPUTING SYSTEM BASED ON USER SKILLS

PRIOR FOREIGN APPLICATION

This application claims priority from United Kingdom (GB) patent application number 1415426.4, filed Sep. 1, 2014, which is hereby incorporated herein by reference in its entirety.

BACKGROUND

One or more aspects relate to the data processing field. More specifically, one or more aspects relate to the control of access to a computing system.

The background of aspects of the present disclosure is hereinafter introduced with the discussion of techniques relating to its context. However, even when this discussion refers to documents, acts, devices and the like, it does not suggest or represent that the discussed techniques are part of the prior art or are common general knowledge in the field relevant to the aspects of the present disclosure.

Security is a key issue in modern computing systems, especially when they have a distributed architecture. A specific security aspect is the control of activities that may be performed on the computing system by different users (for example, for accessing protected resources thereof); this allows preventing unauthorized users that might perform undesired (and generally dangerous) activities on the computing system. For this purpose, the users are individually granted specific authorizations (i.e., permissions) to perform selected activities on the computing system (for example, by assigning them to predefined roles, such as end-user, developer, administrator).

However, some (unprivileged) users may sporadically need to perform (protected) activities that they are not authorized to perform normally; for example, a developer that has successfully tested a patch of a software application in a development environment may need the authorizations of an administrator to apply it into a production environment.

When this happens, other (privileged) users having the required authorizations are to be involved. This is very time-consuming because of the need of identifying the privileged users, contacting them and obtaining their availability, with a consequent performance degradation (for example, slowing down the fixing of problems in the computing system).

Moreover, the involvement of the privileged users is quite annoying for them. Therefore, it is a relatively common practice for the privileged users to provide their credentials (for example, identifiers and passwords) to the unprivileged users, thereby delegating them the performing of the protected activities. However, this may cause an uncontrolled spreading of the credentials of the privileged users, with consequent security exposures.

Alternatively, U.S. Pat. No. 8,490,093, the entire disclosure of which is hereby incorporated herein by reference, discloses a method for enabling a process to have elevated or escalated privileges to access system resources according to configuration or privilege data maintained in a memory area. Alternatively, when a disconnected user tries to run an untrusted application, the user is given the option of contacting his/her administrator for an identifying code that will allow that particular application to run (such as a one-time use code that will enable the application to run for some period of time specified by the administrator).

A similar mechanism is supported by many operating systems, which have commands allowing users to perform activities with the authorizations of other users (for example, the sudo command in Unix); the activities that may be performed by the users are specified in a configuration file, which provides a large amount of configurability (comprising enabling activities only from specific terminals, requiring re-entry of the passwords of the users).

However, the above-mentioned techniques require a quite complex configuration for defining the activities exceeding their authorizations that may be performed by the users. Moreover, the maintenance of this information is difficult, especially in highly dynamic environments (so that it might easily become out-of-date). All of the above involves an increase of the management costs of the computing system and of the risk of security exposures.

SUMMARY

A simplified summary of aspects of the present disclosure is herein presented in order to provide a basic understanding thereof; however, the sole purpose of this summary is to introduce some concepts of aspects of the disclosure in a simplified form as a prelude to its following more detailed description, and it is not to be interpreted as an identification of key elements nor as a delineation of its scope.

In general terms, aspects of the present disclosure are based on the idea of granting temporary authorizations to the users dynamically.

Particularly, an aspect provides a method for controlling access to a computing system, wherein a temporary authorization for performing a protected activity is granted or denied to a user (which is not authorized to perform the protected activity) according to a comparison between a skill required to perform the protected activity and the skill possessed by the user.

A further aspect provides a computer program for implementing the method and a corresponding computer program product.

A further aspect provides a corresponding system.

BRIEF DESCRIPTION OF THE DRAWINGS

One or more aspects of the present disclosure, as well as further features and the advantages thereof, will best be understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
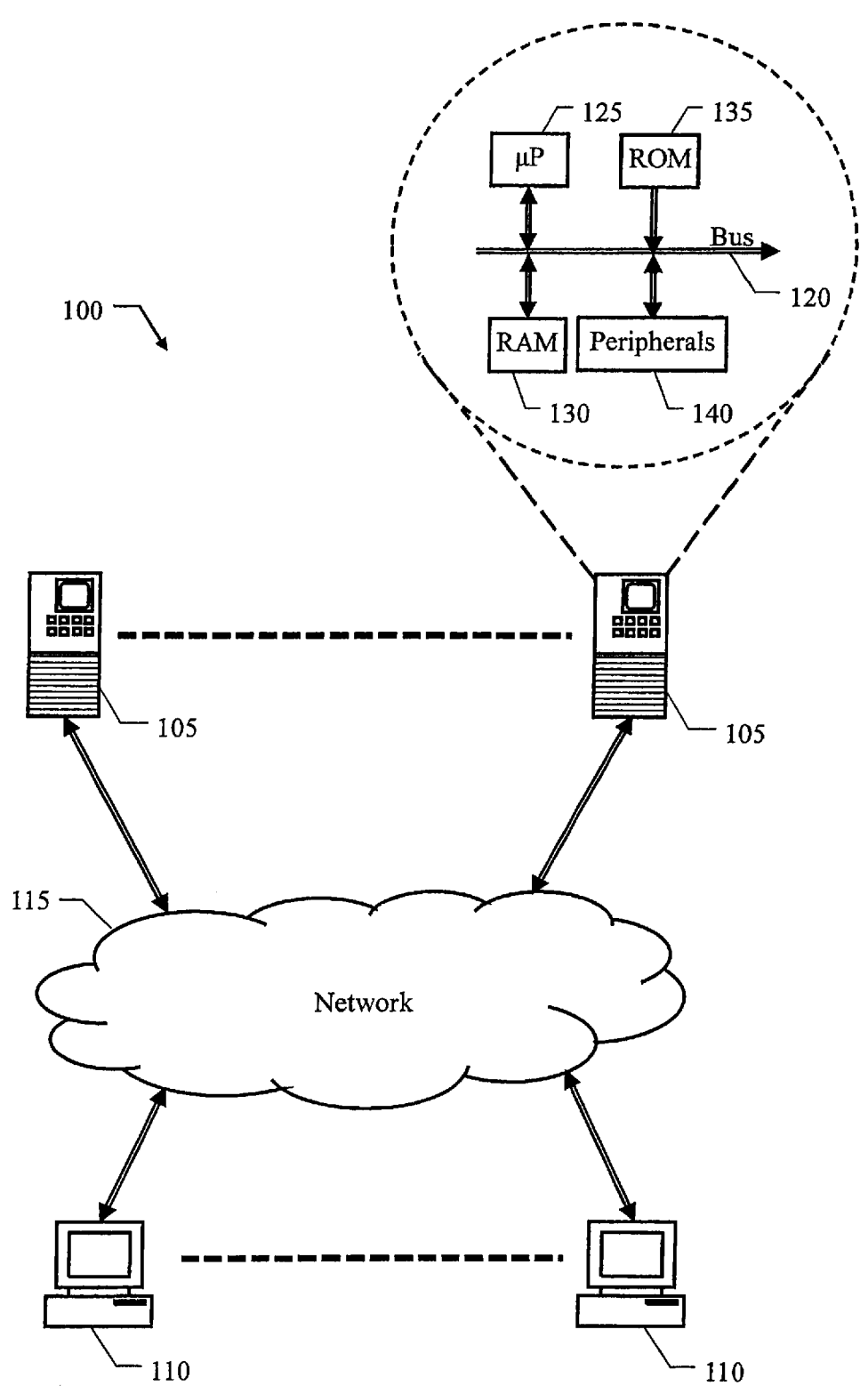
FIG. 1 shows a schematic block diagram of a computing system wherein a solution according to an embodiment of the present disclosure may be practiced.

With reference in particular to FIG. 1, a schematic block diagram is shown of a computing system 100 wherein a solution according to an embodiment of the present disclosure may be practiced.

The computing system 100 has a distributed architecture based on a client/server model. Particularly, one or more server computing machines (or simply servers) 105 provide services to one or more client computing machines (or simply clients) 110; for example, the servers 105 allow users of the clients 110 to, e.g., run software programs, access web sites, retrieve data, store files. For this purpose, the clients 110 communicate with the servers 105 through a network 115 (for example, a Local Area Network (LAN)).

In the context of aspects of the present disclosure, one of the servers 105 (or more) is an access server that controls access to the other servers 105 (for example, to protected resources thereof, such as their operating system, file system, executable files). Particularly, specific authorizations are granted to each user for performing selected activities on the servers 105. For this purpose, the users are generally assigned to predefined roles (with corresponding authorizations); for example, in the context of a database, end-users are authorized to read/write its data, database managers are authorized to update the structure of its tables, and system administrators are authorized to update its DataBase Management System (DBMS).

The servers 105 are generally grouped in server farms (not shown in the figure). A generic server 105 is formed by several units that are connected in parallel to a bus structure 120. In detail, one or more microprocessors (μP) 125 control operation of the server 105; a RAM 130 is directly used as a working memory by the microprocessors 125, and a ROM 135 stores basic code for a bootstrap of the server 105. Moreover, the server 105 comprises different peripherals 140; particularly, the peripherals 140 comprise a mass-memory (implemented by one or more storage units of the server farm) and a network adapter (which is used to plug the server 105 into the server farm, at the same time allowing it to access the network 115).

Figure 2A:
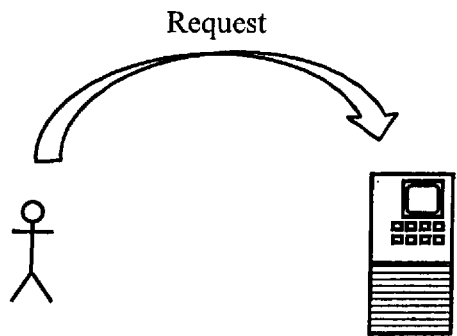
FIG. 2A-FIG. 2C show an example application of a solution according to an embodiment of the present disclosure.
Figure 2B:
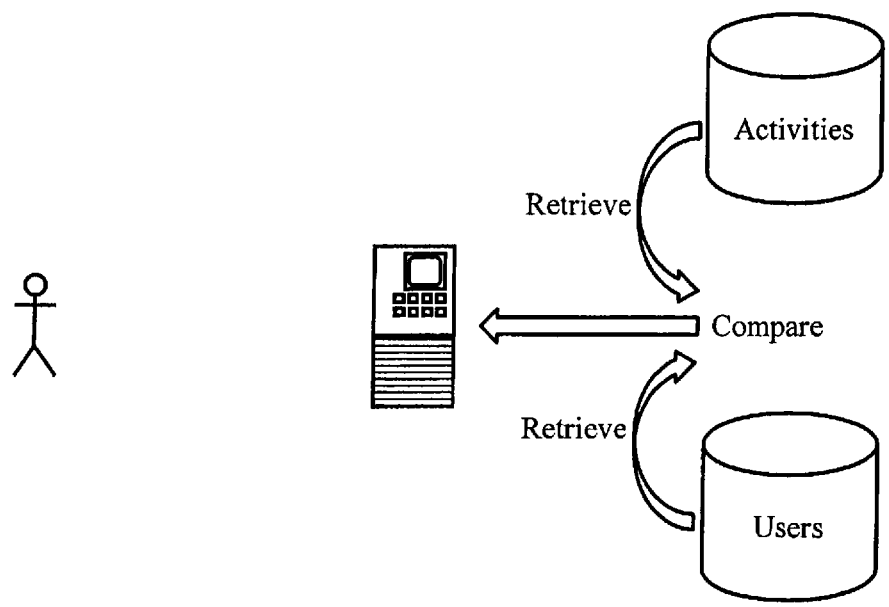
Figure 2C:
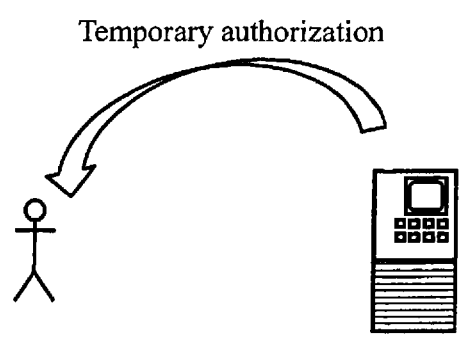

With reference now to FIG. 2A-FIG. 2C, an exemplary application is shown of a solution according to an embodiment of the present disclosure.

Starting from FIG. 2A, an escalation request for performing an activity, e.g., a protected activity, on a generic server (or any other computing system) is submitted by a user, e.g., an unprivileged user that is not authorized to perform it (for example, to the access server in the context at issue); for example, a database manager may submit an escalation request for upgrading a DBMS (requiring the authorizations of a system administrator of the corresponding server).

Moving to FIG. 2B, in a solution according to an embodiment of the present disclosure, one or more activity indicators are retrieved (for example, from a corresponding repository of the access server); the activity indicators are indicative of a skill that should be required to perform the protected activity (for example, jobs, courses). Moreover, one or more user indicators are retrieved (for example, from another repository of the access server); the user indicators are instead indicative of the skill possessed by the user (which has submitted the escalation request). An indication of a capability of the user to perform the protected activity is then determined according to a comparison between the activity indicators and the user indicators (for example, by calculating a capability index as a function thereof).

Moving to FIG. 2C, a temporary authorization for performing the protected activity (i.e., lasting for a limited time window) is granted or denied to the user according to his/her capability (for example, by granting it when the capability index reaches a threshold value). In the above-mentioned example, the database manager may be granted the authorizations of a system administrator on the server for 2 hours if s/he possesses a proven expertise on the DBMS and on the corresponding operating system.

In this way, the users may be allowed sporadically to perform protected activities that they are not authorized to perform normally. This result is achieved without any involvement of other (privileged) users having the required authorizations, with corresponding saving of time and consequent performance improvement (for example, fixing of problems faster); moreover, the same result is achieved without any spreading of the credentials of the privileged users (for example, their passwords), with consequent reduction of security exposures.

The above-mentioned technique self-adapts dynamically to the users. This result is achieved automatically (at least in part), so that any configuration and maintenance work is substantially reduced.

In any case, the actual capabilities of the users to perform the protected activities (in turn based on their skills versus the required ones) are now taken into account for granting/denying the corresponding temporary authorizations. As a result, the temporary authorizations are granted only to users that should be (at least potentially) not dangerous for the computing system, thereby strongly reducing the risk of any damages thereto.

Figure 3:
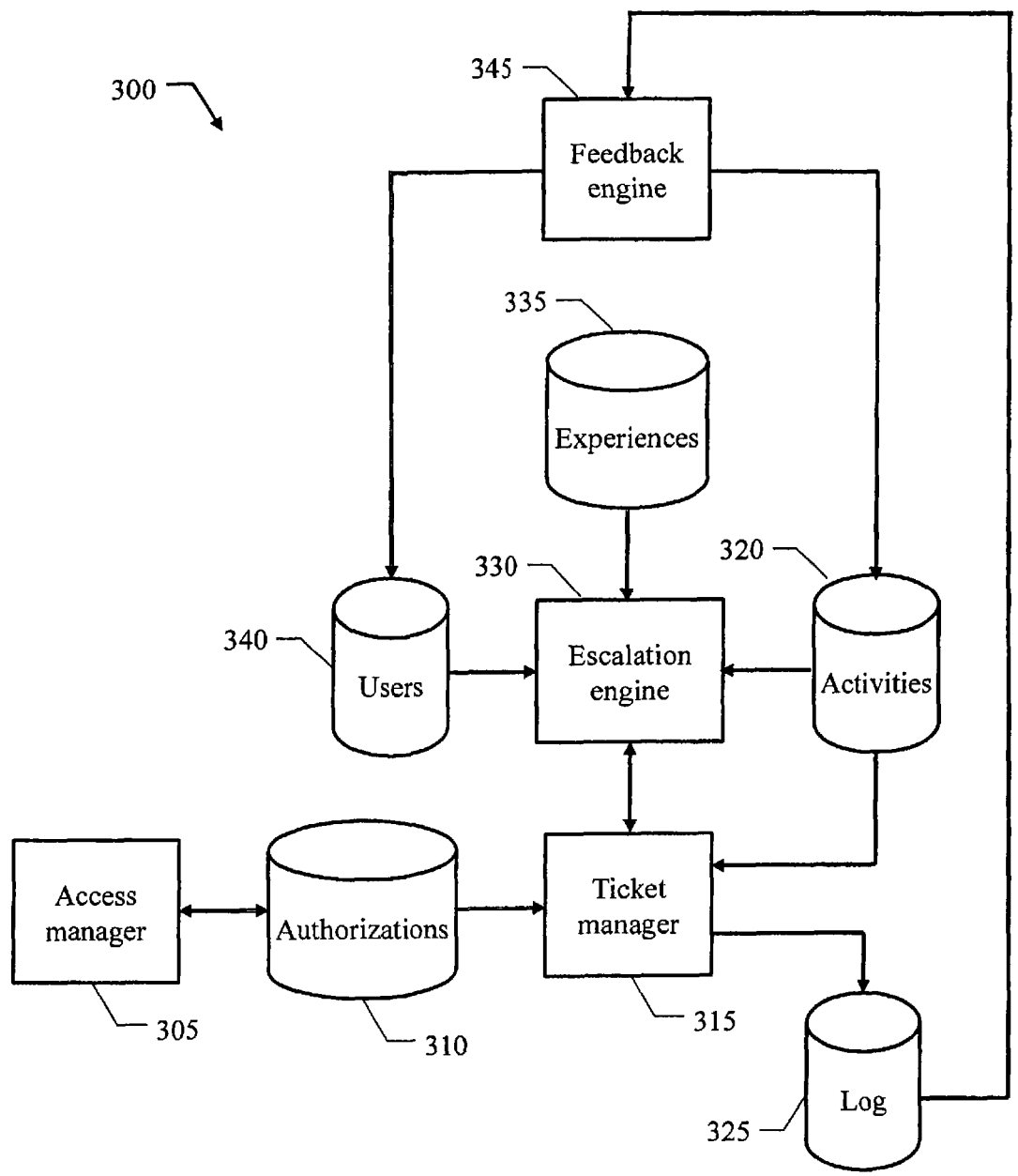
FIG. 3 shows examples of software components that may be used to implement a solution according to an embodiment of the present disclosure.

With reference now to FIG. 3, example software components are shown that may be used to implement a solution according to an embodiment of the present disclosure.

Particularly, all the software components (programs and data) are denoted as a whole with the reference 300. The software components 300 are typically stored in the mass memory and loaded (at least partially) into the working memory of the access server when the programs are running. The programs are initially installed into the mass memory, for example, from removable storage units or from the network. In this respect, each software component may represent a module, segment or portion of code, which comprises one or more executable instructions for implementing the specified logical function.

More specifically, an access manager 305 (for example, "IBM Security Identity and Access Manager" by IBM Corporation, trademarks thereof) controls any operations that may be performed on each server assigned thereto by the different users that are registered with the access manager. For this purpose, the access manager 305 controls an authorization repository 310. The authorization repository 310 comprises an entry for each (registered) user. The user is defined by its credentials (for example, identifier and password) and is associated with one or more authorizations (for example, defined by a role thereof) that are granted to him/her (referred to as user authorizations). The access manager 305 runs in the background as a service, which intercepts any request of performing an operation on the servers and allows or prevents it according to the corresponding user authorizations.

In a solution according to an embodiment of the present disclosure, a ticket manager 315 is added. The ticket manager 315 exposes a Graphical User Interface (GUI) for submitting any escalation request (for performing a protected activity by a user that is not authorized to perform it). For this purpose, the ticket manager 315 as well accesses the authorization repository 310.

Moreover, the ticket manager 315 accesses an activity repository 320. The activity repository 320 comprises an entry for each known activity category (for example, installation of a specific software/hardware on a specific operating system). Each activity category is defined by one or more activity properties. Each activity property indicates a protected operation that is to be executed for performing every protected activity belonging to the activity category. The activity property is associated with one or more specific authorizations that are required to execute the corresponding protected operation (referred to as property authorizations). For example, the activity category relating to the installation of a specific software application on a specific operating system has activity properties for writing in an installation directory of the software application (requiring the authorization to read/write on it), for running an installation program of the software application (requiring the authorization to run it), and for modifying libraries of the operating system (requiring the authorization to read/write them). The activity property is further associated with one or more property indicators, as a whole defining the activity indicators of every protected activity belonging to the activity category; each property indicator (for example, in the form of a pair key/value) indicates a skill type (among a plurality of known ones, for example, knowledge of specific software applications/operating systems) and a level thereof, referred to as an operation level (for example, normalized from 0 to 100), which are required to execute the corresponding protected operation. Moreover, the activity category is associated with an estimated duration of every protected activity belonging to the activity category.

The ticket manager 315 further controls a log repository 325. The log repository 325 stores historical information for every escalation request (for example, whether the corresponding temporary authorization has been granted or denied, an actual duration of the performing of the corresponding protected activity, and/or any execution exception raised during it).

The ticket manager 315 interfaces with an escalation engine 330, which determines the capability of the user to perform the protected activity of any escalation request. For this purpose, the escalation engine 330 as well accesses the activity repository 320.

Moreover, the escalation engine 330 accesses an experience repository 335. The experience repository 335 comprises an entry for each known experience type that may be gained by the users (for example, specific jobs, courses). The experience type is associated with one or more experience properties. Each experience property (for example, in the form of a pair key/value) indicates one of the skill types that the experience type contributes to increase, and a skill coefficient that measures its unitary contribution thereto (for example, per year for the jobs or as a whole for the courses).

The escalation engine 330 further accesses a user repository 340. The user repository 340 comprises an entry for each user that is registered with the access manager 305. The user is associated with one or more experience indicators (contributing to define his/her user indicators). Each experience indicator (for example, in the form of a pair key/value) indicates one of the experience types and possibly the corresponding experience degree (for example, duration of the jobs) that has been gained by the user. The user is further associated with one or more adjustment indicators; each adjustment indicator (for example, in the form of a pair key/value) indicates one of the skill types and an adjustment factor thereof (depending on previous performance of the user in its context).

A feedback engine 345 accesses the log repository 325. The feedback engine 345 updates the activity repository 325 and the user repository 340 according to the corresponding historical information.

Figure 4A:
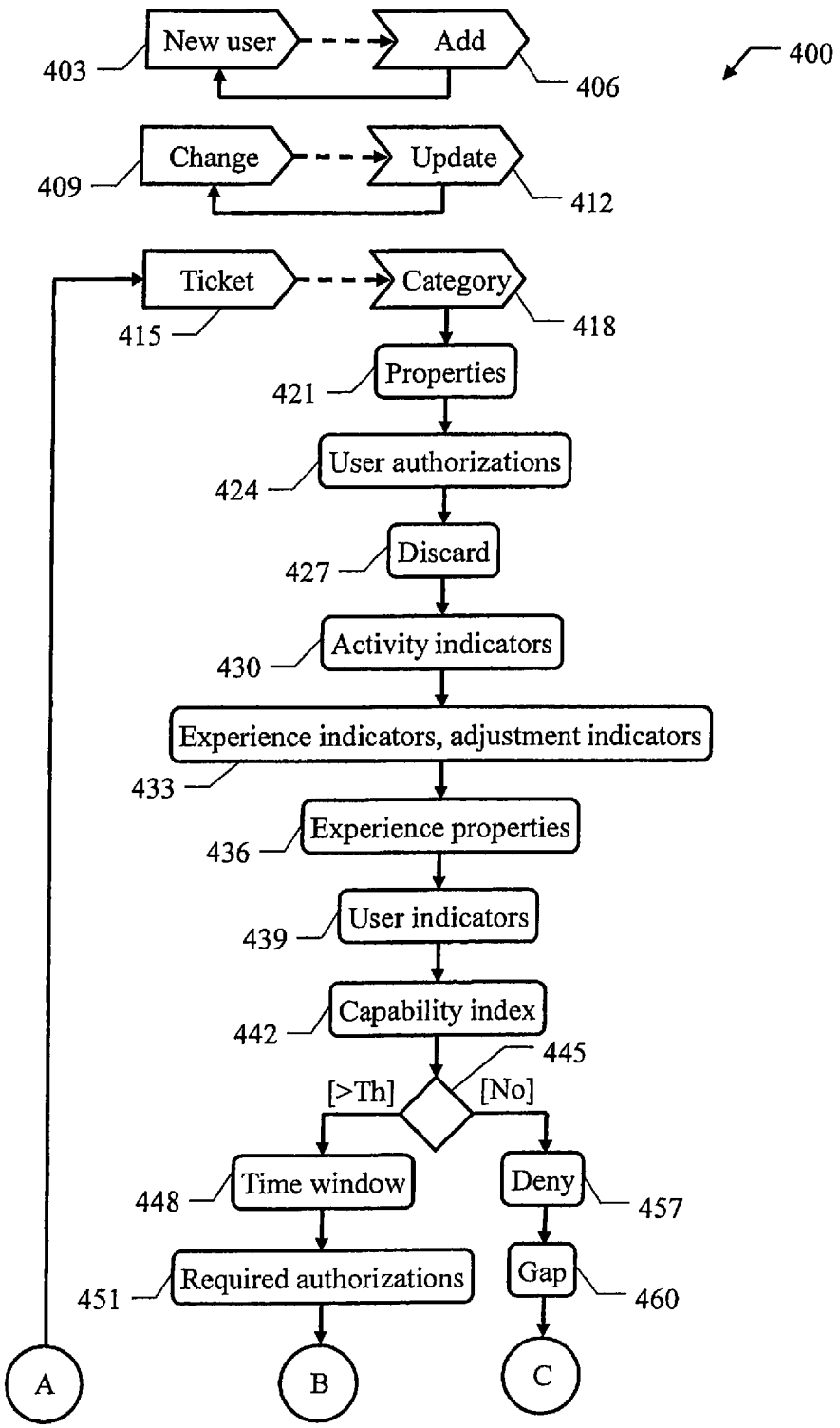
FIG. 4A-FIG. 4B show an activity diagram describing the flow of activities relating to an implementation of a solution according to an embodiment of the present disclosure.
Figure 4B:
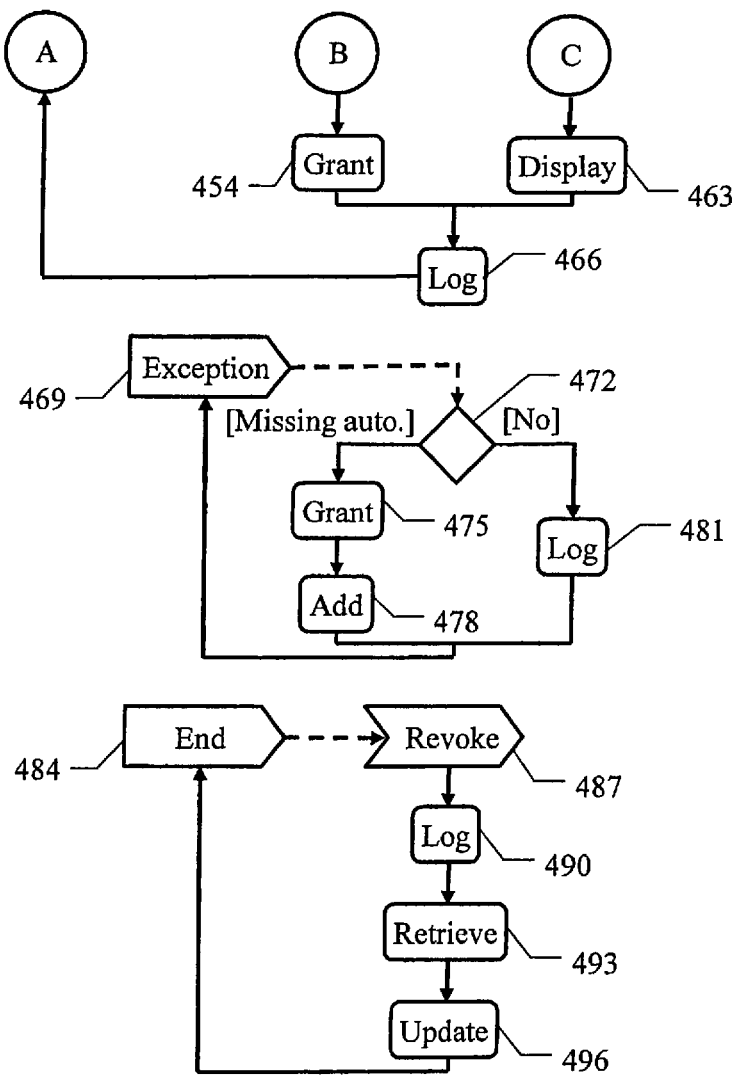

With reference now to FIG. 4A-FIG. 4B, an activity diagram is shown describing the flow of activities relating to an implementation of a solution according to an embodiment of the present disclosure.

Particularly, the diagram represents an example process for controlling the access to a generic computing system with a method 400. In this respect, each block may represent one or more executable instructions for implementing the specified logical function on the access server.

More specifically, the process passes from block 403 to block 406 whenever a new user has been added to the authorization repository. In response thereto, a corresponding entry is added to the user repository; the entry is then populated with the experience indicators of the user based on personal information thereof (for example, previous jobs with their durations, current job with its starting date and attended courses, such as retrieved from an employee repository). The flow of activity then returns to the block 403 waiting for a next addition of a new user.

In a completely independent way, the process passes from block 409 to block 412 whenever the experience of any user has changed (for example, s/he has passed to a new job or has attended a new course, such as again retrieved from the employee repository). In response thereto, the corresponding entry in the user repository is updated accordingly (i.e., by adding or modifying corresponding experience indicators). The flow of activity then returns to the block 409 waiting for a next change of experience.

In a completely independent way, the process passes from block 415 to block 418 whenever any escalation request for performing a protected activity is submitted by an unprivileged user that is not authorized to perform it (for example, by opening a corresponding ticket with the ticket manager); in response thereto, the user is prompted to select the corresponding activity category from a list of the known ones extracted from the activity repository (with the involvement of an administrator that may be automatically requested when the protected activity does not belong to any one of the known activity categories). Passing to block 421, the activity properties of the selected activity category (comprising their operation authorizations) are retrieved from the activity repository. Moreover, the user authorizations of the user are retrieved at block 424 from the authorization repository. Each activity property whose operation authorizations are already granted to the user (i.e., comprised in the user authorizations) is discarded at block 427. The process continues to block 430, wherein the properties indicators (i.e., skill types and operation levels) of the (remaining) activity properties (defining the activity indicators of the protected activity) are retrieved from the activity repository.

Passing to block 433, the experience indicators (i.e., experience types and possible experience degrees) and the adjustment indicators (i.e., skill types and adjustment factors) of the user are retrieved from the user repository. Moreover, the experience property (i.e., skill type and skill coefficient) of each experience type of the user is retrieved from the experience repository at block 436. For each one of these skill types (which are possessed by the user), the corresponding user indicator is calculated at block 439. The user indicator comprises a level of the skill type that is possessed by the user (referred to as user level), and the user level is set to the corresponding skill coefficient multiplied by the sum of the experience degrees of the corresponding experience types, further multiplied by the adjustment factor of the skill type (if any).

With reference now to block 442, a capability indicator (indicating the capability of the user to perform the protected activity of the escalation request) is calculated. For example, the capability index is set to the sum of a term for each property indicator; the term is equal to the difference (clipped to a maximum positive value, for example, 0%-1% of the maximum operation/user levels) between the user level of the corresponding user indicator (measuring the level of its skill type that is possessed by the user, set to zero if missing) and the operation level of the property indicator (measuring the required level of the same skill type).

The flow of activity branches at block 445 according to the value of this capability indicator.

If the capability indicator is (possibly strictly) higher than a threshold value (for example, −5%-0% of the maximum operation/user levels), the user may be authorized to perform the protected activity. Therefore, a time window for performing the protected activity is defined at block 448 (for example, by entering it by the user after being suggested the expected duration of the corresponding activity category retrieved from the activity repository). Passing to block 451, one or more authorizations required to perform the protected activity are determined from the operation authorizations of the (remaining) activity properties of the selected activity category, by removing any operation authorization that is already granted to the user (i.e., comprised in the user authorizations thereof). These required authorizations are then granted temporarily for the time window to the user at block 454 in FIG. 4B (for example, by retrieving the credentials of a user possessing them from the authorization repository).

Referring back to the block 445 (FIG. 4A), if the capability indicator is (possibly strictly) lower than the threshold value, the user may not be authorized to perform the protected activity. Therefore, the escalation request is refused at block 457 (by closing the corresponding ticket). Passing to block 460, a skill gap between the one required to perform the protected activity and the one possessed by the user is determined. For example, the skill gap is defined by each skill type having the difference between the corresponding user level and operation level (possibly strictly) lower than a threshold value (for example, from 0 to their maximum positive value), with the absolute value of this difference that measures the missing level of the skill type (referred to as missing skill type). For each missing skill type, any course contributing to increase its level is determined from the experience repository. The information so obtained is then provided to the user at block 463 in FIG. 4B (for example, by displaying the missing level of each missing skill type and then suggesting the courses that are more suitable to remove it according to their skill coefficients). In this way, the user is encouraged to improve his/her skill for the protected activities that s/he needs to perform.

The flow of activity merges at block 466 from either the block 454 or the block 463. At this point, information about the escalation request is added to the log repository for auditing purposes (for example, comprising the user submitting it, its timestamp, the corresponding protected activity, whether the escalation request has been granted or denied). The flow of activity then returns to the block 415 waiting for a next escalation request.

In a completely independent way, the process passes from block 469 (FIG. 4B) to block 472 whenever an execution exception is raised while performing any protected activity (of a granted temporary authorization). The flow of activity branches at block 472 according to the cause of the execution exception. If the execution exception has been due to a missing authorization for performing a protected activity, this missing authorization is granted 475 to the corresponding user as above. Continuing to block 478, a corresponding new activity property is created and added to the activity category to which the protected activity belongs; the operation authorizations of the new activity property are set to the missing authorization, and its property indicators are set according to the ones of similar activity properties. Referring back to the block 472, if the execution exception has not been due to a missing authorization for performing any protected activity, information about the execution exception (for example, the corresponding escalation request) is added to the log repository at block 481. The flow of activity merges from either the block 478 or the block 481, thereby returning to the block 469 waiting for a next execution exception.

In a completely independent way, the process passes from block 484 to block 487 whenever any temporary authorization is released (with the closure of the corresponding ticket). This may happen either when the corresponding time window ends (as detected by a continuous monitoring of all of them) or when the corresponding protected activity has been completed (as indicated by a corresponding request of the user). In any case, all the corresponding required authorizations (that have been granted temporarily to the user) are revoked. Information about the release of the temporary authorization (for example, the actual duration of the corresponding protected activity) is added to the log repository at block 490. All the pieces of information relating to the released temporary authorization are then retrieved from the log repository at block 493. The user indicators of the corresponding user are updated at block 496 accordingly. For example, each adjustment factor may be decreased when one or more execution exceptions (being not due to a missing authorization for performing the protected activity) has been raised in respect of a protected operation relating to its skill type (such as by a percentage proportional to the number/severity thereof), or all the adjustment factors may be increased or decreased when the actual duration of the protected activity is higher or lower, respectively, than the expected one (for example, by a percentage proportion to their difference). In this way, the user indicators self-adapt to the actual performance of the user in the relevant contexts. At the same time, the estimated duration of the protected activity is updated accordingly in the activity repository (for example, by setting it to the running average of all the actual durations thereof). The flow of activity then returns to the block 484 waiting for the release of a next temporary authorization.

Naturally, in order to satisfy local and specific requirements, a person skilled in the art may apply many logical and/or physical modifications and alterations to the aspects of the present disclosure. More specifically, although aspects of this disclosure have been described with a certain degree of particularity with reference to one or more embodiments thereof, it should be understood that various omissions, substitutions and changes in the form and details as well as other embodiments are possible. Particularly, different embodiments of aspects of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items); the terms based on, dependent on, according to, function of (and any forms thereof) should be intended as a non-exclusive relationship (i.e., with possible further variables involved); the term a/an should be intended as one or more items (unless expressly indicated otherwise); and the term means for (or any means-plus-function formulation) should be intended as any entity or structure adapted or configured for carrying out the relevant function.

For example, an embodiment provides a method for controlling access to a computing system. The method comprises the following steps, in one example. An escalation request for performing a protected activity on the computing system is received by a user that is not authorized to perform the protected activity. At least one activity indicator (which is indicative of a skill required to perform the protected activity) is retrieved. At least one user indicator (which is indicative of the skill possessed by the user) is retrieved. An indication of a capability of the user to perform the protected activity is determined according to a comparison between said at least one activity indicator and said at least one user indicator. A temporary authorization for performing the protected activity is granted or denied to the user according to the capability thereof; the temporary authorization lasts for a limited time window.

However, the same method may be used to control the access to any computing system (see below). The escalation request may be received in any way (for example, by generating it automatically when the user requests to perform the protected activity). The protected activity may be of any type (for example, for consuming, entering or using any type and number of resources of the computing system, for logging in the computing system, for shutting it down); the user may be identified in any way (for example, according to a process requesting the protected activity, to a computer from which the escalation request is submitted). The activity indicators and the user indicators may be in any number and of any type (see below), and they may be retrieved in any way (for example, from a common repository, even downloaded locally). The capability of the user to perform the protected activity may be determined in any way (for example, by using any threshold value, by calculating a capability index for each skill type, comparing each capability index with a corresponding threshold value and then using a voting mechanism for determining the capability of the user to perform the protected activity). The temporary authorization may be granted in any way (for example, by changing the role of the user) and for any time window (for example, depending on a workload of the computing system).

In an embodiment, the step of receiving an escalation request comprises assigning the escalation request to a selected one of a plurality of predefined activity categories. Each activity category is associated with one or more activity properties; each activity property is indicative of a protected operation to be executed for performing each protected activity belonging to the activity category and of at least one operation authorization required to execute the protected operation. The step of granting or denying a temporary authorization comprises granting said at least one operation authorization required to execute each protected operation of the selected activity category to the user for the time window.

However, the activity categories may in any number and of any type (for example, for updating core functionalities of the operating system); moreover, the escalation request may be assigned to the selected activity category in any way (for example, inferring it from a description thereof entered by the user). Each activity category may be associated with any number and type of activity properties, with each activity property that may be indicative of any type of protected operation (for example, updating system registry) and of any number and type of operation authorizations (for example, administrator privileges). In any case, the possibility of determining the authorizations required to perform the protected activity in another way is not excluded (for example, by selecting them manually by the user).

In an embodiment, the step of receiving an escalation request comprises retrieving at least one user authorization of the user, and discarding each activity property of the selected activity category that has the corresponding at least one operation authorization comprised in the at least one user authorization.

However, the activity properties may be discarded in any way (for example, manually by the user). In any case, the possibility of always taking into account all the activity properties of the selected activity category is not excluded.

In an embodiment, the step of retrieving at least one activity indicator comprises retrieving at least one property indicator for each activity property; each activity indicator is indicative of one of a plurality of predefined skill types and of an activity level thereof required to execute the corresponding protected operation. The step of retrieving at least one user indicator comprises retrieving the at least one user indicator, which is indicative of one of the skill types and of a user level thereof possessed by the user.

However, the property indicators and/or the user indicators may be in any number and of any type, with each one that may be indicative of a skill type selected among any number and type of them (for example, a specific software developing expertise) and of any operation/user level (for example, defined by discrete values such as low, medium and high). In any case, nothing prevents defining the skills in a different way (even in general without defining any skill type).

In an embodiment, the retrieving at least one user indicator comprises the following operations. At least one experience indicator (which is indicative of an experience type and of a possible experience degree thereof that has been gained by the user) is retrieved. At least one experience property is retrieved for each experience type of the at least one experience indicator; each experience property is indicative of one of the skill types that the experience type contributes to increase and of a skill coefficient measuring a unitary contribution thereto. One of the at least one user indicator is calculated for each skill type of the at least one experience property; the user indicator is calculated according to the skill coefficient of the experience property and to the experience degree of each corresponding experience indicator.

However, the experience indicators may be in any number and of any type, with each one that may be indicative of an experience type selected among any number and type of them (for example, published articles, given speeches) and of any experience degree (for example, comprising an age thereof). Each experience property may be indicative of any number of skill types and of any skill coefficient thereof (for example, comprising a reduction factor for its age). Each user indicator may be calculated in any way (for example, by weighting the experience degrees according to the corresponding ages). In any case, the possibility of defining the user indicators directly (i.e., by setting the user levels of the relevant skill types) is not excluded.

In an embodiment, the method further comprises the following steps in response to the granting of the temporary authorization. An execution exception (which is due to at least one missing authorization for performing the protected activity) is received. The at least one missing authorization is granted to the user for the time window. A new activity property is added to the selected activity category for the at least one missing authorization.

However, the new activity property may be added in any way (for example, by initializing its property indicators to default values or by requesting their manual setting). In any case, the possibility of simply closing the ticket in response to the execution exception is not excluded.

In an embodiment, the method further comprises the following steps in response to the granting of the temporary authorization. The performing of the protected activity is monitored; the at least one skill indicator of the user is updated according to the monitored performing of the protected activity.

However, the performing of the protected activity may be monitored in any way (see below), and the skill indicators of the user may be updated accordingly in any way (for example, by increasing/decreasing the experience degrees, either at the level of the whole protected activity or individually for each protected operation). In any case, these steps may also be omitted in a simplified implementation.

In an embodiment, the step of monitoring the performing of the protected activity comprises registering each execution exception in performing the protected activity that is not due to any missing authorization therefore and/or registering a duration of the performing of the protected activity.

However, the monitoring may involve different, alternative or additional operations (for example, the collection of manual feedbacks).

In an embodiment, the method further comprises the following steps in response to the denying of the temporary authorization. At least one learning action (required by the user to improve the skill thereof for reaching the skill required to perform the protected activity) is determined. An indication of the at least one learning action is provided to the user.

However, the learning actions may be in any number and of any type (for example, lectures) and they may be determined in any way (for example, by only selecting the ones that allow reaching the required skill in the shortest time). The indication of the learning actions may be provided to the user in any way (for example, via e-mail). In any case, this feature may be omitted in a simplified implementation.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further embodiment provides a computer program product comprising a non-transitory computer readable medium embodying a computer program, which computer program is loadable into a working memory of a computing system thereby configuring the computing system to perform the same method.

However, the computer program may be implemented as a stand-alone module, as a plug-in for a pre-existing software program (for example, an access manager), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base-band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may also be carried out on a system based on a different architecture (for example, a local, wide area, global, cellular or satellite network), and exploiting any type of (wired and/or wireless) connections. However, its implementation on a stand-alone computer is not excluded. In any case, each computing machine used to implement the method may have another structure or may comprise similar elements; moreover, it is possible to replace the computing machine with any code execution entity, based on either a physical machine or a virtual machine, or any combination thereof.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A computer-implemented method of controlling access to a computing system, the computer-implemented method comprising:
   executing, by one or more processors in a distributed computing system, a background service to intercept requests to perform an operation on one or more servers of the distributed computing system, and to determine for each request, whether to grant or deny the request, wherein the service comprises:
      intercepting, by the one or more processors, an escalation request for performing a protected activity on the computing system by a user not authorized to perform the protected activity, comprising:
         assigning the escalation request to a selected activity category of a plurality of predefined activity categories, each activity category being associated with one or more activity properties, each activity property indicative of a protected operation to be executed for performing each protected activity belonging to the activity category and of at least one operation authorization required to execute the protected operation;
      retrieving, by the one or more processors, at least one activity indicator, from a corresponding repository of a server of the one or more servers, being indicative of a skill required to perform the protected activity, comprising:
         retrieving at least one property indicator for each activity property, each property indicator being indicative of one of a plurality of predefined skill types and of an activity level thereof required to execute the corresponding protected operation;
      retrieving, by the one or more processors, at least one user indicator being indicative of skill possessed by the user, comprising:
         retrieving said at least one user indicator, each one being indicative of one of the skill types and of a user level thereof possessed by the user;
         retrieving at least one experience indicator being indicative of an experience type and of a possible experience degree thereof being gained by the user;
         retrieving at least one experience property for each experience type of said at least one experience indicator, each experience property being indicative of one of the skill types that the experience type contributes to increase and of a skill coefficient measuring a unitary contribution thereto; and
         calculating one user indicator of said at least one user indicator for each skill type of said at least one experience property, the one user indicator being calculated according to the skill coefficient of the experience property and to the possible experience degree of each corresponding experience indicator;
      determining, by the one or more processors, an indication of a capability of the user to perform the protected activity according to a comparison between said at least one activity indicator and said at least one user indicator; and
      granting or denying, by the one or more processors, to the user according to the capability thereof a temporary authorization for performing the protected activity, the temporary authorization lasting for a limited time window, the granting or denying the temporary authorization comprising:
  granting said at least one operation authorization required to execute each protected operation of the selected activity category to the user for the limited time window.

2. The computer-implemented method according to claim 1, wherein said receiving the escalation request comprises:
  retrieving at least one user authorization of the user; and
  discarding each activity property of the selected activity category having the corresponding at least one operation authorization comprised in said at least one user authorization.

3. The computer-implemented method according to claim 1, further comprising in response to the granting of the temporary authorization:
  receiving an execution exception being due to at least one missing authorization for performing the protected activity;
  granting said at least one missing authorization to the user for the limited time window; and
  adding a new activity property to the selected activity category for said at least one missing authorization.

4. The computer-implemented method according to claim 1, further comprising in response to the granting of the temporary authorization:
  monitoring the performing of the protected activity; and
  updating at least one skill indicator of the user according to the monitored performing of the protected activity.

5. The computer-implemented method according to claim 4, wherein said monitoring the performing of the protected activity comprises performing at least one of:
  registering each execution exception in performing the protected activity not being due to any missing authorization therefore; or
  registering a duration of the performing of the protected activity.

6. The computer-implemented method according to claim 1, further comprising in response to the denying of the temporary authorization:
  determining at least one learning action required by the user to improve the skill thereof for reaching the skill required to perform the protected activity; and
  providing an indication of said at least one learning action to the user.

7. A computer system for controlling access to a computing system, the computer system comprising:
  a memory; and
  a processor in communication with the memory, wherein the computer system is configured to perform a method, said method comprising:
    executing, by one or more processors in a distributed computing system, a background service to intercept requests to perform an operation on one or more servers of the distributed computing system, and to determine for each request, whether to grant or deny the request, wherein the service comprises:
      intercepting, by the one or more processors, an escalation request for performing a protected activity on the computing system by a user not authorized to perform the protected activity, comprising:
        assigning the escalation request to a selected activity category of a plurality of predefined activity categories, each activity category being associated with one or more activity properties, each activity property indicative of a protected operation to be executed for performing each protected activity belonging to the activity category and of at least one operation authorization required to execute the protected operation;
      retrieving, by the one or more processors, at least one activity indicator, from a corresponding repository of a server of the one or more servers, being indicative of a skill required to perform the protected activity, comprising:
        retrieving at least one property indicator for each activity property, each property indicator being indicative of one of a plurality of predefined skill types and of an activity level thereof required to execute the corresponding protected operation;
      retrieving, by the one or more processors, at least one user indicator being indicative of skill possessed by the user, comprising:
        retrieving said at least one user indicator, each one being indicative of one of the skill types and of a user level thereof possessed by the user;
        retrieving at least one experience indicator being indicative of an experience type and of a possible experience degree thereof being gained by the user;
        retrieving at least one experience property for each experience type of said at least one experience indicator, each experience property being indicative of one of the skill types that the experience type contributes to increase and of a skill coefficient measuring a unitary contribution thereto; and
        calculating one user indicator of said at least one user indicator for each skill type of said at least one experience property, the one user indicator being calculated according to the skill coefficient of the experience property and to the possible experience degree of each corresponding experience indicator;
      determining, by the one or more processors, an indication of a capability of the user to perform the protected activity according to a comparison between said at least one activity indicator and said at least one user indicator; and
      granting or denying, by the one or more processors, to the user according to the capability thereof a temporary authorization for performing the protected activity, the temporary authorization lasting for a limited time window, the granting or denying the temporary authorization comprising:
        granting said at least one operation authorization required to execute each protected operation of the selected activity category to the user for the limited time window.

8. The computer system according to claim 7, wherein said receiving the escalation request comprises:
  retrieving at least one user authorization of the user; and
  discarding each activity property of the selected activity category having the corresponding at least one operation authorization comprised in said at least one user authorization.

9. The computer system according to claim 7, wherein the method further comprises in response to the granting of the temporary authorization:
  monitoring the performing of the protected activity; and
  updating at least one skill indicator of the user according to the monitored performing of the protected activity.

10. The computer system according to claim 7, wherein the method further comprises in response to the denying of the temporary authorization:
  determining at least one learning action required by the user to improve the skill thereof for reaching the skill required to perform the protected activity; and
  providing an indication of said at least one learning action to the user.

11. A computer program product for controlling access to a computing system, the computer program product comprising:
  a non-transitory computer readable storage medium readable by a processing circuit and storing instructions for execution by the processing circuit for performing a method comprising:
    executing, by one or more processors in a distributed computing system, a background service to intercept requests to perform an operation on one or more servers of the distributed computing system, and to determine for each request, whether to grant or deny the request, wherein the service comprises:
      intercepting, by the one or more processors, an escalation request for performing a protected activity on the computing system by a user not authorized to perform the protected activity, comprising:
        assigning the escalation request to a selected activity category of a plurality of predefined activity categories, each activity category being associated with one or more activity properties, each activity property indicative of a protected operation to be executed for performing each protected activity belonging to the activity category and of at least one operation authorization required to execute the protected operation;
      retrieving, by the one or more processors, at least one activity indicator, from a corresponding repository of a server of the one or more servers, being indicative of a skill required to perform the protected activity, comprising:
        retrieving at least one property indicator for each activity property, each property indicator being indicative of one of a plurality of predefined skill types and of an activity level thereof required to execute the corresponding protected operation;
      retrieving, by the one or more processors, at least one user indicator being indicative of skill possessed by the user, comprising:
        retrieving said at least one user indicator, each one being indicative of one of the skill types and of a user level thereof possessed by the user;
        retrieving at least one experience indicator being indicative of an experience type and of a possible experience degree thereof being gained by the user;
        retrieving at least one experience property for each experience type of said at least one experience indicator, each experience property being indicative of one of the skill types that the experience type contributes to increase and of a skill coefficient measuring a unitary contribution thereto; and
        calculating one user indicator of said at least one user indicator for each skill type of said at least one experience property, the one user indicator being calculated according to the skill coefficient of the experience property and to the possible experience degree of each corresponding experience indicator;
      determining, by the one or more processors, an indication of a capability of the user to perform the protected activity according to a comparison between said at least one activity indicator and said at least one user indicator; and
      granting or denying, by the one or more processors, to the user according to the capability thereof a temporary authorization for performing the protected activity, the temporary authorization lasting for a limited time window, the granting or denying the temporary authorization comprising:
        granting said at least one operation authorization required to execute each protected operation of the selected activity category to the user for the limited time window.

12. The computer program product according to claim 11, wherein said receiving the escalation request comprises:
  retrieving at least one user authorization of the user; and
  discarding each activity property of the selected activity category having the corresponding at least one operation authorization comprised in said at least one user authorization.

13. The computer program product according to claim 11, wherein the method further comprises in response to the granting of the temporary authorization:
  monitoring the performing of the protected activity; and
  updating at least one skill indicator of the user according to the monitored performing of the protected activity.

14. The computer program product according to claim 11, wherein the method further comprises in response to the denying of the temporary authorization:
  determining at least one learning action required by the user to improve the skill thereof for reaching the skill required to perform the protected activity; and
  providing an indication of said at least one learning action to the user.

* * * * *